W. W. RHAME & S. H. NUCKOLLS.
RESILIENT WHEEL.
APPLICATION FILED MAY 24, 1910.
998,636.
Patented July 25, 1911.
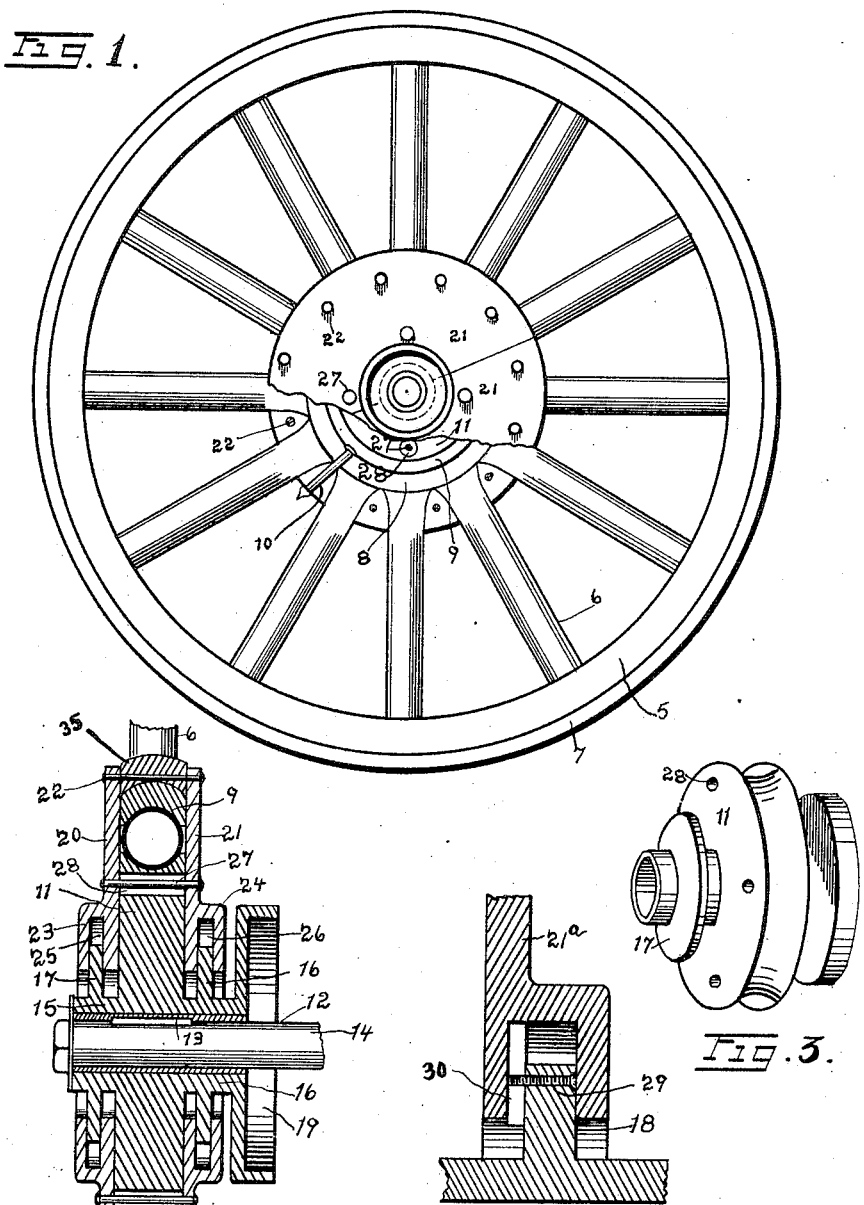

UNITED STATES PATENT OFFICE.

WILLIE W. RHAME, OF SUMMERVILLE, AND SAMUEL H. NUCKOLLS, OF CHARLESTON, SOUTH CAROLINA; SAID NUCKOLLS ASSIGNOR TO SAID RHAME.

RESILIENT WHEEL.

998,636.    Specification of Letters Patent.    Patented July 25, 1911.

Application filed May 24, 1910. Serial No. 563,108.

*To all whom it may concern:*

Be it known that we, WILLIE W. RHAME and SAMUEL H. NUCKOLLS, citizens of the United States of America, residing at Summerville and Charleston, respectively, in the counties of Dorchester and Charleston, respectively, and State of South Carolina, have invented certain new and useful Improvements in Resilient Wheels, of which the following is a specification.

This invention relates to resilient wheels, the object of the invention being to provide a structure in which the hub portion of the wheel is cushioned with relation to the rim portion thereof, the rim portion of the wheel presenting a non-puncturable surface to the road bed, and the cushioning of the hub with relation to the rim serving to efficiently absorb the shocks and jars incident to the passage of the vehicle over the road.

A further object of the invention is the provision of a wheel of the character above set forth constructed in such manner as to not only provide for vertical movement of the hub with relation to the rim, but also constructed to efficiently resist the lateral strains brought upon the wheel when the vehicle to which the wheel is applied tends to skid when turning corners at a high rate of speed.

A further object of the invention is the provision of improved means for securing the parts of the wheel together without weakening them by the employment of a multiplicity of bolts.

Further objects and advantages of the invention will be set forth in the detailed description which now follows.

In the accompanying drawing, Figure 1 is a side elevation of a wheel constructed in accordance with the invention, with parts thereof broken away, Fig. 2 is a vertical sectional view through the hub portion of said wheel, Fig. 3 is a detail perspective view of the spool member of the hub, and, Fig. 4 is a detail sectional view of a modified connection between one of the flanges of the spool and its cover plate.

Like numerals designate corresponding parts in all of the figures of the drawing.

Referring to the drawing, the numeral 5 designates the felly, and 6, the spokes of the wheel. A tire 7 may be a solid rubber tire if desired, or may be made of metal. The inner ends of the spokes bear upon a ring 8 and this ring in turn bears upon an air cushion 9 which cushion may be provided with an inflating tube 10, if desired. The inner periphery of the resilient cushion is seated in and bears upon the grooved portion of a hub spool 11. This spool is engaged by an axle boxing 12 and turns therewith, and this axle boxing is secured by a key 13 to an axle 14. The hub spool 11 is provided with lateral extensions 15 and 16. The extension 15 carries an annular flange 17 and the extension 16 carries an annular flange 18. The extension 16 also carries a brake drum 19. Sectional cover plates 20 and 21 are secured at their outer edges by bolts 22. These cover plates are provided with offset flanges 23 and 24 arranged in such manner that annular recesses 25 and 26 are provided for the reception of the flanges 17 and 18.

It is to be noted that while the flanges 17 and 18 are securely held within the annular recesses 25 and 26 against lateral movement, these flanges are capable of a limited vertical movement in said recesses, it being understood that this vertical movement is resisted by the pneumatic or resilient cushion 9 disposed between the hub spool and the ring 8.

Where the device is to be used as a driving wheel, it is of course desirable to connect the rim portion of the wheel to the hub portion thereof in such manner that the rim portion may be driven from the hub portion while being capable of vertical movement with relation thereto. To accomplish this, bolts 27 are provided which pass through openings 28 of larger diameter than the bolts, said openings being formed in the hub spool. It is apparent that this serves to accomplish the drive of the rim portion of the wheel from the hub while permitting the vertical movement referred to.

In Fig. 4, a modified method of driving the cover plates and consequently the rim portion of the wheel from the hub portion thereof has been illustrated. In this modified structure, the screw 29 is passed through the flange 18 and enters a recessed portion 30 of the cover plate 21ª. This permits vertical movement of the flange 18 with relation to the cover plate 21ª but causes the cover plate to turn with said flange.

It will be seen that the hub and its flanges 17 and 18 are made in one piece and that the cover plates are in one piece with the flanges 23 and 24. When these parts are interengaged with each other, there is therefore no danger of the wheel being shaken to pieces when subjected to rough usage. This renders it possible to dispense with the employment of bolts for securing these parts together, which among other things, results in materially lessening the cost of the finished wheel.

Filling pieces 35 are provided between the spokes and immediately outside of the ring 8, the bolts 22 passing not only through the cover plates, but through these filling pieces, which by reason of their wedge shape, firmly bind the inner ends of the spokes in position.

From the foregoing description, it will be seen that simple and efficient means are herein provided for accomplishing the objects of the invention, but while the elements shown and described are well adapted to serve the purposes for which they are intended, it is to be understood that the invention is not limited to the precise construction set forth, but includes within its purview such changes as may be made within the scope of the appended claim.

Having described our invention, what we claim is:

In a wheel of the character described, the combination with a hub spool, comprising in one integral member a peripherally grooved body portion, a pair of spaced, outstanding, annular flanges and a brake-drum spaced from one of said annular flanges, of an elastic cushion surrounding said body portion, an annular ring surrounding said cushion and bearing thereon, spokes, the inner ends of which bear against said ring, a pair of sectional cover plates of such diameter as to overlie said annular ring and a portion of the body of the hub, the inner faces of said cover plates lying in direct contact with these members, bolts passing through the cover plates, said bolts tying said cover plates together, said cover plates having integral, inwardly extending, offset flanges at their inner peripheries, whereby annular recesses are formed at the inner peripheries of said cover plates within which the annular flanges of the hub are received and in which said annular flanges are capable of vertical movement, and means for driving said cover plates from the hub, while permitting vertical movement of the hub with relation to said cover plates.

In testimony whereof we affix our signatures in presence of two witnesses.

WILLIE W. RHAME.
SAMUEL H. NUCKOLLS.

Witnesses to signature of Willie W. Rhame:
S. I. DRIGGERS,
S. P. DRIGGERS.

Witnesses to signature of Samuel H. Nuckolls:
CLAYTON L. DREW,
FRANK G. CAMPBELL.

---

Copies of this patent may be obtained for five cents each, by addressing the "Commissioner of Patents, Washington, D. C."